(12) United States Patent
Kashi et al.

(10) Patent No.: US 9,297,895 B2
(45) Date of Patent: Mar. 29, 2016

(54) SYSTEMS AND METHODS FOR IN-TRAIL OPPORTUNITY WINDOW ESTIMATOR

(75) Inventors: Rajanikanth Nagaraj Kashi, Bangalore (IN); Roger Rathbun, Bothell, WA (US); Scott Richard Gremmert, Redmond, WA (US); Dilip Mathews, Bangalore (IN); Nainatara Kumble, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 954 days.

(21) Appl. No.: 13/600,131

(22) Filed: Aug. 30, 2012

(65) Prior Publication Data

US 2015/0348421 A1 Dec. 3, 2015

(51) Int. Cl.
G06F 17/10 (2006.01)
G01S 13/93 (2006.01)
G08G 1/16 (2006.01)

(52) U.S. Cl.
CPC ............... *G01S 13/931* (2013.01); *G08G 1/16* (2013.01)

(58) Field of Classification Search
CPC . G01S 13/931; G01S 2013/9353; G08G 1/16; B60T 7/22; B60W 30/09
USPC ........................................................ 701/301
See application file for complete search history.

(56) References Cited

U.S. PATENT DOCUMENTS

| | | | |
|---|---|---|---|
| 3,243,803 A | 3/1966 | Thue | |
| 4,043,194 A * | 8/1977 | Tanner | 73/178 T |
| 6,683,541 B2 * | 1/2004 | Staggs et al. | 340/961 |
| 7,408,552 B2 * | 8/2008 | Kellman et al. | 345/440 |
| 2003/0091772 A1 * | 5/2003 | Stevens et al. | 428/35.7 |
| 2004/0044446 A1 * | 3/2004 | Staggs | 701/16 |
| 2007/0174005 A1 * | 7/2007 | Bitar et al. | 701/211 |
| 2010/0286900 A1 * | 11/2010 | Depape et al. | 701/120 |
| 2010/0332054 A1 * | 12/2010 | Brandao et al. | 701/3 |
| 2011/0144833 A1 * | 6/2011 | Tjorhom et al. | 701/3 |

(Continued)

FOREIGN PATENT DOCUMENTS

| | | |
|---|---|---|
| EP | 2485205 A2 | 8/2012 |
| EP | 2485205 A3 | 3/2013 |

OTHER PUBLICATIONS

European Search Report from counterpart European Application No. 13181427.9, dated Mar. 14, 2014, 3 pp.

(Continued)

*Primary Examiner* — Ian Jen
(74) *Attorney, Agent, or Firm* — Shumaker & Sieffert, P.A.

(57) ABSTRACT

Systems and methods are operable to identify and indicate opportunities for an In-Trail procedure (ITP) aircraft to make an ITP altitude change. An exemplary embodiment receives information corresponding to a desired ITP altitude for the ITP aircraft and a projected window period; estimates at least one ITP maneuver opportunity window based on the estimated location of each of the plurality of other aircraft and based on a current airspeed and a current altitude of the ITP aircraft; generates a screen shot that presents an ITP maneuver opportunity window icon, wherein the ITP maneuver opportunity window icon graphically indicates the soonest time and the latest time that the ITP aircraft may initiate the ITP maneuver, and wherein the ITP maneuver opportunity window icon indicates an altitude change made by the ITP aircraft will maintain minimum safe self-separation distances from the plurality of other aircraft during the ITP maneuver.

20 Claims, 5 Drawing Sheets

(56) References Cited

U.S. PATENT DOCUMENTS

| | | | |
|---|---|---|---|
| 2011/0187588 A1* | 8/2011 | Khatwa et al. | 342/26 B |
| 2011/0224847 A1* | 9/2011 | Singer et al. | 701/4 |
| 2011/0270473 A1* | 11/2011 | Reynolds et al. | 701/7 |
| 2011/0276198 A1* | 11/2011 | Khatwa et al. | 701/3 |
| 2011/0282568 A1* | 11/2011 | Khatwa et al. | 701/121 |
| 2011/0316857 A1* | 12/2011 | Pepitone et al. | 345/467 |
| 2012/0095623 A1* | 4/2012 | Barral et al. | 701/4 |
| 2012/0203448 A1* | 8/2012 | Pepitone et al. | 701/120 |

OTHER PUBLICATIONS

Examination Report from counterpart European Application No. 13181427.9, dated Mar. 31, 2014, 6 pp.

U.S. Appl. No. 13/600,150, by Rajanikanth Nagaraj Kashi, filed Aug. 30, 2012.

Response to Examination Report dated Mar. 31, 2014, from counterpart European Application No. 13181427.9, filed Sep. 26, 2014, 26 pp.

* cited by examiner

SYSTEMS AND METHODS FOR IN-TRAIL OPPORTUNITY WINDOW ESTIMATOR

BACKGROUND OF THE INVENTION

During oceanic flights, crew of an aircraft may wish to adjust the flight level of their aircraft to take advantage of favorable winds that may be found at different altitudes, thereby improving fuel efficiency and/or reducing flight times. For example, if the aircraft is travelling in the direction of the jet stream, it is desirable for the aircraft to fly within the jet stream so as to take advantage of prevailing wind speeds. Conversely, if the aircraft is heading in a direction that opposes prevailing wind speeds, it is desirable to fly at an altitude where the prevailing opposing wind speeds are absent or are minimal.

However, due to aircraft traffic congestion in the various established oceanic flight routes, the crew of the aircraft must be aware of other nearby aircraft before initiating an altitude change so as to avoid a mid-air collision. That is, the crew of the aircraft must know the location, bearing, altitude, and airspeed of nearby aircraft so that when the altitude change is implemented, minimum safe self-separation distances from other nearby aircraft are maintained.

Aircraft are now equipped with automatic dependent surveillance broadcast (ADS-B) equipment, or variations thereof. ADS-B equipment periodically broadcasts information pertaining to the aircraft's current location, bearing, altitude, and/or airspeed. Other information, such as weather condition information, may be included in the ADS-B broadcast. Aircraft receiving the ADS-B information are then able to accurately determine the requisite information about nearby aircraft so that an altitude change may be safely implemented.

An In-Trail procedure (ITP) has been established so that altitude-changing aircraft, referred to as an ITP aircraft, are able to maintain safe-separation distances from other nearby aircraft during an ITP ascent/descent maneuver. An example ITP procedure specifies a minimum safe self-separation distance between aircraft of fifteen nautical miles that are either in front of or behind the ITP aircraft during the ITP maneuver.

When there are multiple nearby aircraft, some of which are travelling in the same direction of the ITP aircraft and others which are travelling in opposite directions to the ITP aircraft, the process of identifying opportunity windows to initiate a compliant ITP maneuver becomes relatively complex. The process of identifying ITP maneuver opportunity windows is further complicated when the multiple nearby aircraft are travelling at different velocities and altitudes.

Accordingly, there is a need in the arts to assist the crew of the ITP aircraft to identify ITP maneuver opportunity windows. Further, when multiple nearby aircraft are present, there is a need in the arts to assist the crew of the ITP aircraft to identify multiple ITP ascent/descent maneuver opportunity windows.

SUMMARY OF THE INVENTION

Systems and methods of identifying ITP maneuver opportunity windows and presenting ITP maneuver opportunity window information to the crew are disclosed. An exemplary embodiment receives information corresponding to a desired ITP altitude for the ITP aircraft and a projected window period; estimates at least one ITP maneuver opportunity window based on the estimated location of each of the plurality of other aircraft and based on a current airspeed and a current altitude of the ITP aircraft; generates a screen shot that presents an ITP maneuver opportunity window icon, wherein the ITP maneuver opportunity window icon graphically indicates the soonest time and the latest time that the ITP aircraft may initiate the ITP maneuver, and wherein the ITP maneuver opportunity window icon indicates an altitude change made by the ITP aircraft will maintain minimum safe self-separation distances from the plurality of other aircraft during the ITP maneuver.

BRIEF DESCRIPTION OF THE DRAWINGS

Preferred and alternative embodiments are described in detail below with reference to the following drawings.

DETAILED DESCRIPTION OF THE PREFERRED EMBODIMENT

Systems and methods of identifying In-Trail procedure (ITP) maneuver opportunity windows and presenting ITP maneuver opportunity window information to the crew are disclosed. Embodiments of the ITP maneuver opportunity window estimator system 100 are operable to identify, determine, or estimate a plurality of ITP ascent maneuver opportunity windows and a plurality of ITP descent maneuver opportunity windows for an ITP aircraft in view of other nearby aircraft so that minimum safe self-separation distances are maintained between the ascending (or descending) ITP aircraft and other nearby aircraft. Further, embodiments of the ITP maneuver opportunity window estimator system 100 are operable to further consider nearby weather conditions such that identified ITP ascent maneuver opportunity windows and/or ITP descent maneuver opportunity windows do not require the ITP aircraft to travel through potentially unsafe weather conditions. Also, embodiments of the ITP maneuver opportunity window estimator system 100 are configured to identify ITP ascent maneuver opportunity windows based on current ascent capabilities of the ascending ITP aircraft, and/or based on predefined ascent or descent limitations. For example, a potential ITP ascent/descent maneuver opportunity window may be identified, but if the ITP aircraft is not able to satisfy the ascent rate requirements for that ITP maneuver, that particular ITP ascent/descent maneuver opportunity window will not be indicated to the crew. The various embodiments are then operable to generate a visual presentation of the identified ITP ascent maneuver opportunity windows and/or ITP descent maneuver opportunity windows for presentation on a display that is viewable by the crew of the ITP aircraft. The crew then better appreciates when they may perform an ITP ascent maneuver or an ITP descent maneuver (generically referred to as an ITP maneuver).

Figure 1:
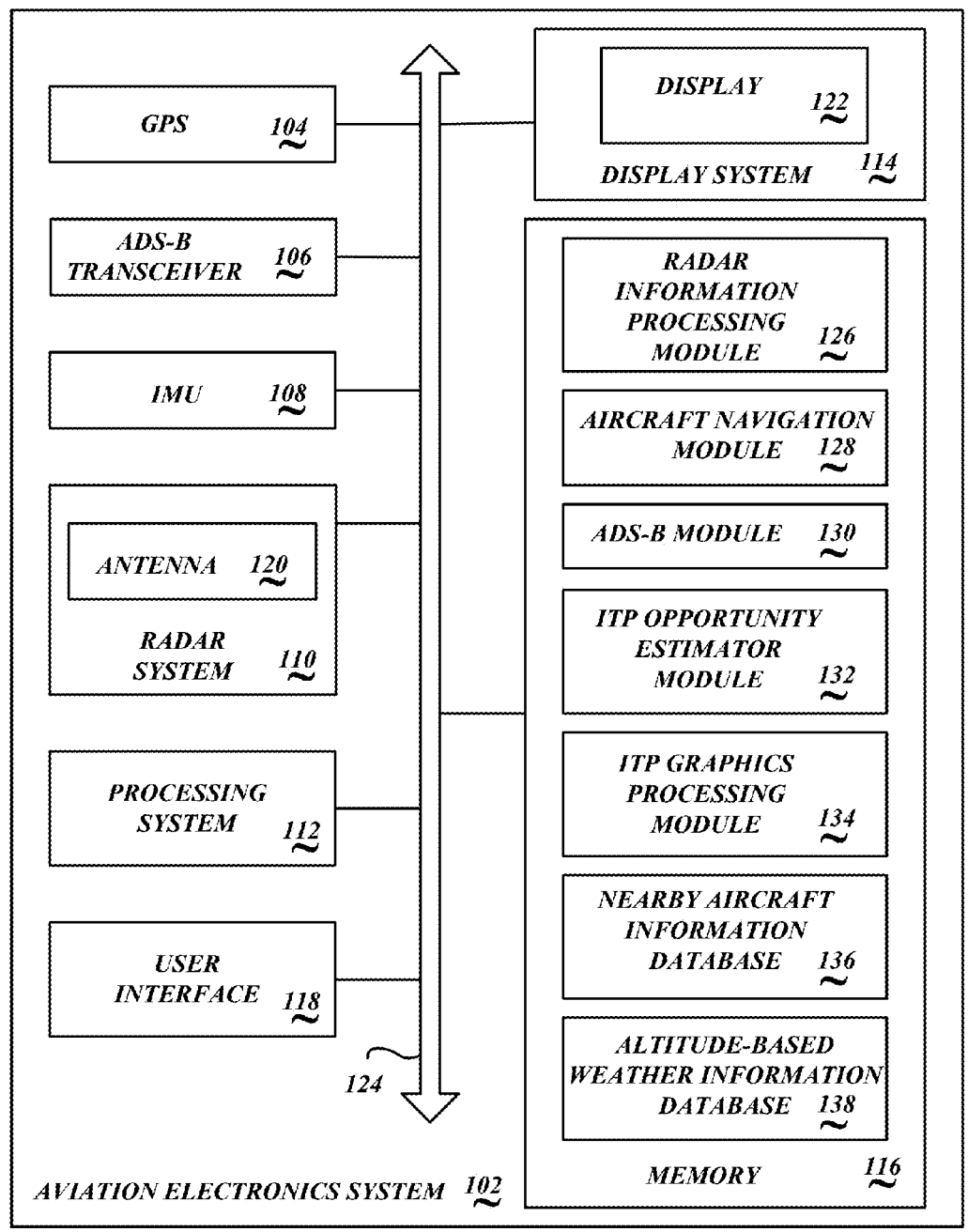
FIG. 1 is a block diagram of an embodiment of an In-Trail procedure (ITP) maneuver opportunity window estimator system.

FIG. 1 is a block diagram of an embodiment of the ITP maneuver opportunity window estimator system 100 implemented in an aviation electronics system 102 of an installation aircraft. The aviation electronics system 102 includes a global positioning system (GPS) 104, an automatic dependent surveillance broadcast (ADS-B) transceiver 106, an inertial measurement unit (IMU) 108, a radar system 110, a processing system 112, a display system 114, a memory 116, and a crew interface 118. The radar system 110 includes an antenna 120. The display system 114 includes a display 122. It is appreciated that the aviation electronics system 102 includes many other components and/or systems that are not illustrated or described herein.

The above-described components, in an exemplary embodiment, are communicatively coupled together via communication bus 124. In alternative embodiments of the aviation electronics system 102, the above-described components may be communicatively coupled to each other in a different manner. For example, one or more of the above-described components may be directly coupled to the processing system 112, or may be coupled to the processing system 112 via intermediary components (not shown).

The memory 116 comprises portions for storing a radar information processing module 126, an aircraft navigation module 128, an ADS-B module 130, an ITP opportunity window estimator module 132, and an ITP graphics processing module 134. In some embodiments, the processing module 126, the aircraft navigation module 128, the ADS-B module 130, the ITP opportunity window estimator module 132, and/or the ITP graphics processing module 134 may be integrated with other logic, may be integrated into other modules, or reside in other memories (not shown). In other embodiments, some or all of these memory and other data manipulation functions in the various modules may be provided by other electronic devices suitably connected to the aviation electronics system 102. For example, one or more of the modules may be implemented in an electronic flight bag (EFB). Modules 126, 128, 130, 132, 134, and/or database 136 residing in the memory 116 are retrieved and executed by the processing system 112 or another suitable processing system. In other embodiments, the modules 126, 128, 130, 132, 134 may be implemented together as a common module, may be integrated into other modules, or reside in other memories (not shown).

In an exemplary embodiment, a nearby aircraft information database 136 and/or an altitude-based weather information database 138 may be stored in the memory 116. Further, the databases 136 and/or 138 may be implemented with other databases, may be implemented in various formats, such as a buffer or the like, and/or may be implemented in another memory (not shown).

Other ITP maneuver opportunity window estimator system 100 embodiments may include some, or may omit some, of the above-described flight information processing components. Further, additional components not described herein may be included in alternative embodiments.

The memory 116 may be any suitable memory device or system. Depending upon the embodiment, the memory 116 may be a dedicated memory system, may be part of another component or system, and/or may be a distributed memory system. The memory 116 may also include other logic, modules and/or databases not illustrated or described herein.

The GPS 104 is configured to receive a plurality of satellite signals which permit the aircraft navigation module 128 to accurately determine the installation aircraft's current location, and optionally, determine the installation aircraft's altitude. The IMU 108 comprises a system of accelerometers, gyroscopes and the like that are configured to sense movement of the installation aircraft. Based on the sensed movement, the aircraft navigation module 128 may accurately determine the installation aircraft's location, bearing, altitude, and/or airspeed.

The ADS-B transceiver 106 is configured to receive communications from multiple nearby aircraft. The received communications include information pertaining to the broadcasting nearby aircraft, such as current bearing, altitude, airspeed, intent information and/or location. Further, the ADS-B transceiver 106 is configured to periodically broadcast the current location, bearing, altitude, and/or airspeed of the installation aircraft. Other information, such as weather condition information, prevailing wind speeds or the like, may be included in the ADS-B broadcast.

The radar system 110 may be any suitable radar system, such as, but not limited to, a weather radar that is operable to detect weather (which may be determined as, but not limited to, 4-Dimensional weather cube data) that is located relatively far away from the installation aircraft and/or to detect nearby aircraft. The radar system 110 includes an antenna 120 that is operable to emit radar signals and receive radar returns. A radar return is reflected energy from an object upon which the emitted radar pulse is incident on. The antenna 120 is swept in a back-and-forth motion, in an up and down direction, and/or in other directions of interest, such that the radar system 110 is able to detect weather and/or other aircraft, in an area of interest about the installation aircraft.

The user interface 118 is configured to receive various operating instructions from the crew of the installation aircraft. For example, the crew may control presentation of determined ITP maneuver opportunity windows on the display 122 or on another display device.

The radar information processing module 126 processes radar returns detected by the antenna 120 of the radar system 110. Various types of weather, and their associated attributes, are determined by the radar information processing module 126. Additionally, in some types of radar systems 110, location and/or altitude of other nearby aircraft may be determined based on the processed radar returns. Further, the radar information processing module 126 may generate a displayable image corresponding to a graphical presentation of the weather information and/or the multiple nearby aircraft. The displayable image may be communicated to the display system 114 for presentation on the display 122 or another suitable display.

The ADS-B module 130 is configured to process the information received by the ADS-B transceiver 106 such that the current location, bearing, altitude, and/or airspeed of nearby aircraft can be determined. Further, the ADS-B module 130 is configured to generate the signal that is broadcast from the ADS-B transceiver 106 which includes the current location, bearing, altitude, and/or airspeed of the installation aircraft. If other information, such as weather condition information, is included in the ADS-B broadcast, the ADS-B module 130 is configured to extract that additional information and provide the extracted information to another module or device.

The ITP opportunity window estimator module 132 is configured to determine ITP maneuver opportunity windows for the installation aircraft. ITP maneuver opportunity windows are determined based on the installation aircraft's current and estimated future location, bearing, altitude, and airspeed, and based on the current and estimated future location, bearing, altitude, and/or airspeed of a plurality of nearby aircraft which are flying in the vicinity of the installation aircraft.

The ITP graphics processing module 134 is configured to generate a displayable presentation of the determined ITP maneuver opportunity windows determined by the ITP opportunity window estimator module 132. The ITP graphics processing module 134 prepares an image corresponding to the ITP maneuver opportunity windows which may be graphically depicted on the display 122 or on another suitable display device using a suitable icon. For example, an image presenting ITP maneuver opportunity window icons may be presented on the display of an EFB. Alternatively, or additionally, some installation aircraft may have a plurality of displays 122 in the cockpit, wherein different information may be presented on different displays 122.

Figure 2:
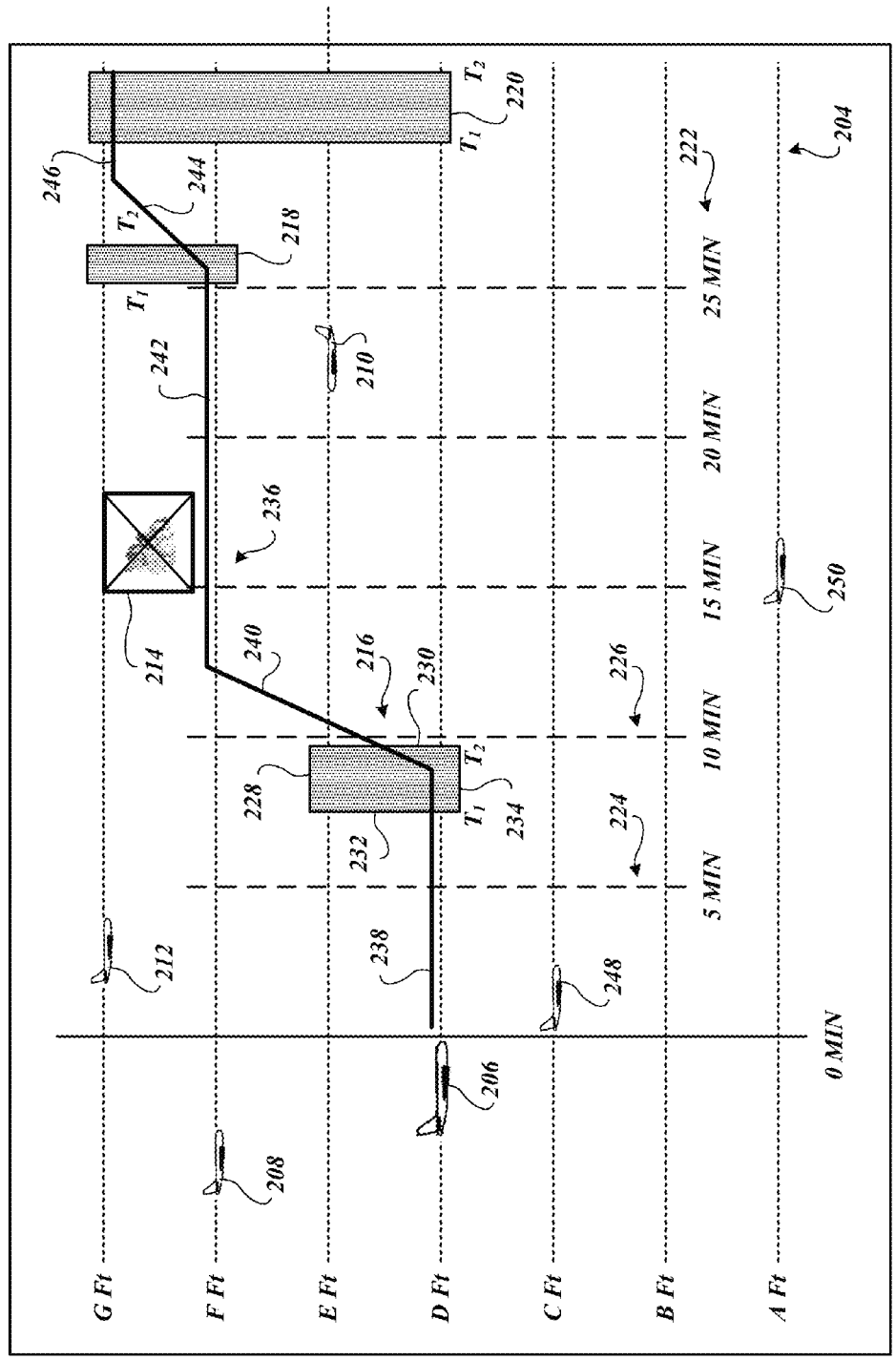
FIG. 2 is a simplified example screen shot of a display of a plurality of ascent ITP maneuver opportunity windows determined by an embodiment of the ITP maneuver opportunity window estimator system.
Figure 3:
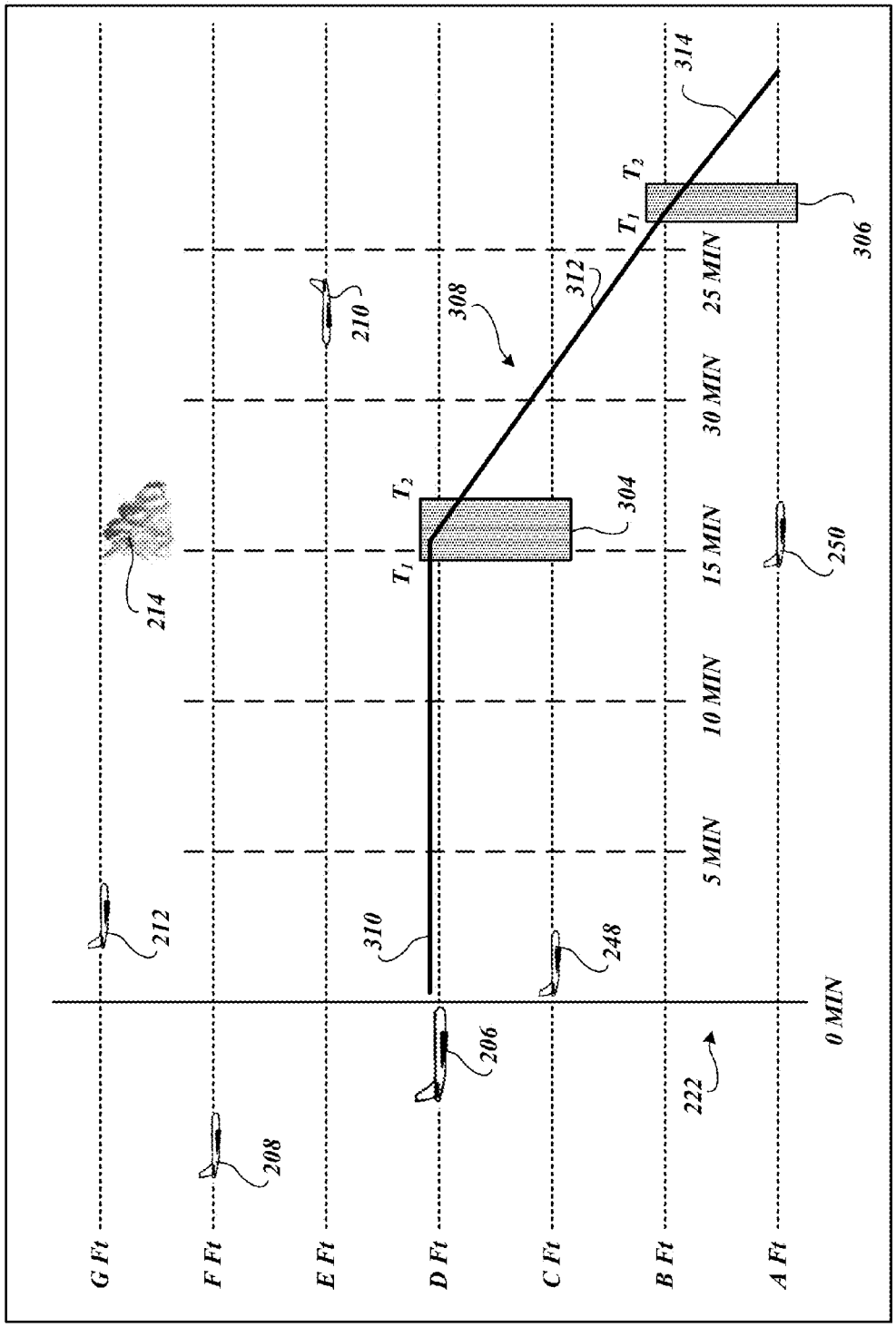
FIG. 3 is a simplified example screen shot of a display of a plurality of descent ITP maneuver opportunity windows determined by an embodiment of the ITP maneuver opportunity window estimator system.

FIG. 2 is a simplified example screen shot 202 of a display of a plurality of ascent ITP maneuver opportunity windows determined by an embodiment of the ITP maneuver opportunity window estimator system 100. FIG. 3 is a simplified example screen shot 302 of a display of a plurality of descent ITP maneuver opportunity windows determined by an embodiment of the ITP maneuver opportunity window estimator system 100.

The screen shots 202, 302 may be displayed on the display 122, the display of an EFB, or on another suitable display device. The screen shots 202, 302 illustrate a plurality of altitude lines 204 along a vertical axis which represent aircraft altitude in feet, though any altitude metric may be used. For illustration purposes, the numeric values of the altitudes are labeled with the letters "A" through "G" feet. In the simplified example of FIG. 2, the crew of the installation aircraft 206, hereinafter referred to as the ITP aircraft 206, wishes to ascend to an altitude of "G" feet.

FIG. 2 illustrates a plurality of other nearby aircraft 208, 210, 212 that may impact the ability of the ITP aircraft 206 to safely initiate and complete an ITP ascent maneuver. The other nearby aircraft 208, 210, 212 are ADS-B equipped aircraft which periodically broadcast flight information that is receivable by the ITP aircraft 206. Alternatively, or additionally, some types of the radar system 110 (FIG. 1) onboard the ITP aircraft 206 and/or a traffic collision avoidance system (TCAS) may be operable to determine the location, bearing, altitude, and/or airspeed of the other nearby aircraft 208, 210, 212.

FIG. 2 also illustrates a storm cell 214 that may impact the ability of the ITP aircraft 206 to safely initiate and complete an ITP ascent maneuver. The radar system 110 onboard the ITP aircraft 206 is operable to determine the altitude of, the location of (range from the ITP aircraft 206), and the extent of the storm cell 214. In some embodiments, storm cells or other weather which the ITP aircraft 206 should avoid may be indicated to the crew on the screen shot 202. For example, but not limited to, the region of airspace associated with the storm cell 214 is indicated with a box or other suitable icon. Any suitable icon may be used. Further, any suitable color, highlighting, flashing or the like may be used to indicate weather that the ITP aircraft 206 should avoid during its ITP ascent maneuvers.

Due to traffic congestion from the other nearby aircraft 208, 210, 212 and the presence of the storm cell 214, identifying one or more ITP ascent maneuver opportunity windows, and then performing an ITP ascent maneuver within proscribed minimum aircraft safe self-separation distances, is a relatively complex task that may be difficult for the crew of the ITP aircraft 206 to perform if using only their own personal good judgment. For example, under some ITP guidelines, the minimum aircraft separation distance during any ITP maneuver is 15 miles, though any criterion may be applicable. Thus, any identified ITP ascent maneuver opportunity windows must keep the ITP aircraft 206 at least 15 miles away from the other nearby aircraft 208, 210, 212 at all times during the ITP ascent maneuver.

In the example screen shot 202, the ITP aircraft 206 is illustrated at a current altitude of "D" feet. An aircraft 208 is illustrated as flying behind and above the ITP aircraft 206. The aircraft 208 is traveling in the same general direction as the ITP aircraft 206. It is appreciated that the ITP aircraft 206 cannot begin an immediate ITP ascent maneuver because when the ITP aircraft 206 approaches the "E" feet altitude, the ITP aircraft 206 will be inside (less than) the proscribed minimum safe self-separation distance. However, assuming that the ITP aircraft 206 is traveling faster that the aircraft 208, at some future time, the ITP aircraft 206 will be able to safely initiate an ITP ascent maneuver after it advances ahead of the aircraft 208 by at least the minimum safe self-separation distance.

Another aircraft 210 is illustrated as approaching the ITP aircraft 206 at an altitude that is between the "D" and "E" feet levels. It is appreciated that the aircraft 210 and the ITP aircraft 206, assuming that the ITP aircraft 206 remains at the "D" feet altitude, will maintain proscribed minimum aircraft vertical separation distances as they pass each other. Because of the presence of the aircraft 208, the ITP aircraft 206 will able to initiate its ITP ascent maneuver to an altitude of "E" feet or more when it has advanced ahead of the aircraft 208. However, one skilled in the art appreciates that at some point, the ITP aircraft 206 cannot initiate an ITP ascent maneuver as the aircraft 210 approaches the vicinity of the ITP aircraft 206.

Also, another aircraft 212 is illustrated as flying ahead of and above the ITP aircraft 206 at the "G" feet altitude. The aircraft 212 is traveling in the same general direction as the ITP aircraft 206. It is appreciated that the ITP aircraft 206 cannot begin an ITP ascent maneuver (assuming that the aircraft 208 was not present) without considering the location, bearing, altitude, and/or airspeed of the aircraft 212 because when the ITP aircraft 206 approaches the "G" feet altitude, the ITP aircraft 206 might be inside (less than) the proscribed minimum safe self-separation distance.

However, assuming the wind speed at the "G" feet altitude is significantly greater than the wind speed at the current "D" feet altitude of the ITP aircraft 206, the aircraft 212 would be well ahead of the ITP aircraft 206 at some point it time. Accordingly, at some future time, the ITP aircraft 206 will be able to safely initiate an ITP ascent maneuver with respect to the aircraft 212. At that later time, the ITP aircraft 206 may have the opportunity window to initiate an ITP ascent maneuver up to the "G" feet altitude (assuming that the ITP aircraft 206 remains sufficiently far ahead of the aircraft 208).

In some situations, the storm cell 214 may interfere with an ITP ascent maneuver by the ITP aircraft 206. Accordingly, the presence of the storm cell 214 may optionally be considered when identifying ITP ascent maneuver opportunity windows by embodiments of the ITP maneuver opportunity window estimator system 100.

Embodiments of the ITP maneuver opportunity window estimator system 100 are configured to identify a plurality of ITP ascent maneuver opportunity windows for the ITP aircraft 206 to ascend to the desired "G" feet altitude in view of the other nearby aircraft 208, 210, 212 and optionally, in view of the storm cell 214. The identified ascent maneuver opportunity windows are graphically depicted to the crew of the ITP aircraft 206 using suitable ascent maneuver opportunity window icons 216, 218, 220.

The horizontal axis of the screen shot 202 corresponds to a predefined range (distance) ahead of the ITP aircraft 206 and along its planned flight path bearing. That is, the screen shot 202 presents a vertical slice of airspace along the planned flight path of the ITP aircraft 206. The screen shot 202 graphically indicates a range of airspace ahead of the ITP aircraft 206, a range of altitude about and ahead of the ITP aircraft 206, current location information for the other nearby aircraft 208, 210, 212 and the storm cell 214, and the identified ascent maneuver opportunity window icons 216, 218, 220. Accordingly, the crew of the ITP aircraft 206, upon viewing the screen shot 202 will appreciate available ITP ascent maneuver opportunity windows that they may implement to safely ascend to the desired altitude of "G" feet.

Various inputs to the ITP maneuver opportunity window estimator system 100 are provided so that the ITP ascent maneuver opportunity windows may be identified. The inputs include the desired ascent altitude (or descent altitude), which may be input by the crew of the ITP aircraft 206 via the user interface 118. Any suitable user input interface device may be used. In an example embodiment, a key pad device may be used to input numeric information. In another embodiment, a physical actuator (such as a button, dial or the like) may be provided in the cockpit of the ITP aircraft 206 such that the crew may specify the desired ascent (or descent) altitude.

Another input used by embodiments of the ITP maneuver opportunity window estimator system 100 is information pertaining to the current and estimated future flight characteristics of the ITP aircraft 206. Current flight characteristics include velocity (relative velocity and/or velocity over ground), current altitude, current bearing, and optionally, current location. Future location, bearing, altitude, and/or airspeed may be estimated based on current flight information and/or planned flight information. Any suitable sensor or electronic device may provide this information. Such sensors or devices are known in the arts.

Another input is weather information at the various altitudes, which has been previously received from onboard sensors and/or from other aircraft, and stored in the altitude-based weather information database 138. The weather information may be received from any suitable source and may be updated as more current weather information is received. In some embodiments, the weather information is received from other aircraft in the vicinity of the ITP aircraft 206. Alternatively, or additionally, the weather information may be received from ground-based sources which provide the information based on ground-based sensors, such as radar, or based on processed information received from other aircraft.

When the ITP aircraft 206 intends to perform an ITP ascent maneuver, some embodiments are configured to use current aircraft ascent capabilities of the ITP aircraft 206 when identifying ITP ascent maneuver opportunity windows. It is appreciated that at any given time, the ITP aircraft 206 maximum engine thrust capability may be known, which may then determine the maximum ascent capability of the ITP aircraft 206 in view of its current weight and known performance capabilities (such a lift characteristics of the wings of the ITP aircraft 206).

The estimated ITP maneuver opportunity window is compared with current ascent capabilities of the ITP aircraft 206. The ITP maneuver opportunity window icon associated with the compared ITP maneuver opportunity window is presented only if the current ascent capabilities of the ITP aircraft are sufficient for the ITP aircraft 206 to ascend in accordance with the estimated ITP maneuver opportunity window.

Current weight of the ITP aircraft 206 can be estimated. For example, the gross weight of the ITP aircraft 206 may be known. Fuel weight may be calculated based on the current amount of fuel that is in the ITP aircraft 206. Changes in fuel weight may be calculated based on the fuel consumption rate of the ITP aircraft 206. Passenger, luggage and/or cargo weight may also be known. Accordingly, embodiments may be configured to calculate the current weight of the ITP aircraft 206. Weight information, or information used to compute the various weight components, may be stored into and retrieved from the memory 116 or another memory device, or may be input by the crew via the user interface 118.

Further, current wind speed and wind direction, and wind speed and/or wind direction at the various altitudes, may impact the ascent capability of the ITP aircraft 206. For example, the ITP aircraft 206 may speed up or slow down as it changes altitudes during an ITP ascent or ITP descent maneuver due to changes in the prevailing wind speeds and/or wind directions at different altitudes. Accordingly, embodiments may be configured to modify current aircraft ascent capabilities of the ITP aircraft 206 based on changes in prevailing wind speeds and/or directions.

Based on the current aircraft ascent capabilities of the ITP aircraft 206, the ascent maneuver opportunity window icons 216, 218, 220 may be defined. Further, as the aircraft ascent capabilities of the ITP aircraft 206 change over time, such as when more fuel is consumed which decreases aircraft weight, predicted ascent maneuver opportunity window icons 216, 218, 220 may be determined based on the changing aircraft ascent capabilities of the ITP aircraft 206.

In some embodiments, the aircraft ascent capability of the ITP aircraft 206 may be a predefined value. For example, the aircraft ascent capability of the ITP aircraft 206 may be a predefined rate of ascent that is based on a regulatory-specified maximum ascent rate value, may be based on an ascent rate that is comfortable for the crew or passengers, or may be based on an ascent rate that is appropriate for the cargo that the ITP aircraft 206 may be carrying. The predefined aircraft ascent capability may be stored in the memory 116 or may be specified by the crew of the ITP aircraft 206 via the user interface 118. Similarly, aircraft descent capabilities of the ITP aircraft 206 may be predefined and used when descent maneuver opportunity windows are determined.

Another input that may be optionally used by the various embodiments pertains to weather information along the planned flight path of the ITP aircraft 206. The weather information may be obtained from the radar system 110 (FIG. 1) and/or may be obtained from other sources, such as other aircraft and/or a ground station. The obtained weather information may be stored into the altitude-based weather information database 138, in another portion of the memory 116, or in another memory medium. Alternatively, or additionally, the weather information may be processed in real time as the information is received from the radar system 110.

Another input may be the current flight plan of the ITP aircraft 206. Flight plan information may include planned flight speed, planned bearing, planned waypoints, and/or planned altitudes for the planned flight path of the ITP aircraft 206. The flight plan information may be stored in another portion of the memory 116, or in another memory medium. Alternatively, or additionally, the flight plan information may be modified by the crew of the ITP aircraft 206 such that ascent/descent maneuver opportunity windows are modified as the flight information is revised. Further, proposed changes in the flight plan may be input by the crew and then considered by the various embodiments. Thus, the crew may be able to evaluate and identify potential ITP ascent maneuver (or ITP descent maneuver) opportunity windows based on possible modification of the flight plan.

A further input is the flight information broadcast by the other nearby aircraft that is received by the ADS-B transceiver 106 (FIG. 1). A variety of information may be included in the received ADS-B information, such as, but not limited to, the current location, bearing, altitude, and/or airspeed of the broadcasting aircraft. Further, the received ADS-B information may include information about nearby weather, such as, but not limited to, current wind speed and direction about the broadcasting aircraft. The received ADS-B information is saved into the nearby aircraft information database 136 (FIG. 1). The information is updated as newer broadcasts are received from particular nearby aircraft.

Future location, bearing, altitude, and/or airspeed may be estimated based on current ADS-B information and/or ADS-B intent information. The estimated future location of the other nearby aircraft is then used to determine or estimate the ITP maneuver opportunity windows.

Optionally, the information pertaining to nearby aircraft may be adjusted by information provided by the radar system 110 and/or the GPS 104 (FIG. 1) of the ITP aircraft 206. For example, current location, bearing, altitude, intent information and/or airspeed of nearby aircraft may be adjusted based on a detected range of the nearby aircraft provided by the radar system 110 and/or by using the accurate location information of the ITP aircraft 206 as provided by the GPS 104. The adjusted information may be stored into the nearby aircraft information database 136 as it is determined, and/or may be used as such information is determined while the embodiments are identifying ascent and/or descent maneuver opportunity windows.

Returning to FIG. 2, the screen shot 202 presents three ITP ascent maneuver opportunity window icons 216, 218, 220 to the crew of the ITP aircraft 206. The presented ascent maneuver opportunity window icons 216, 218, 220 are determined by embodiments of the ITP maneuver opportunity window estimator system 100 based on the crew specifying that the crew wants to ascend to the altitude indicated at "G" feet, based on the ADS-B information received from the other nearby aircraft 208, 210, 212, based on the identified storm cell 214, and based on the ascent capability of the aircraft, which may be specified by the crew or determined based on characteristics of the ITP aircraft 206 and/or current wind conditions about the ITP aircraft 206.

In an example embodiment, the ascent maneuver opportunity window icons 216, 218, 220 are presented to the crew in terms of flight time, wherein a plurality of flight times 222 are presented on the screen shot 202. Here, vertical lines are presented with an annotation of the time that it takes for the ITP aircraft 206 to reach a certain position on the screen shot 202. In some embodiments, the various flight times may be related to range out from the ITP aircraft 206. Thus, the crew intuitively appreciates that, for example, in five minutes the ITP aircraft 206 will have traversed a distance that corresponds to the location of the five minute time line 224. Similarly, the crew intuitively appreciates that the aircraft will have traversed a distance corresponding to the ten minute time line 226 after ten minutes of flight time. In some embodiments, the distances associated with the various presented time lines are shown on the screen shot 202. Alternatively, or additionally, the associated distances may be selectable for presentation on the screen shot 202, may be moveable on the screen shot 202, and/or may be removable (de-selectable) from the screen shot 202, based on crew input provided via the user interface 118. Alternatively, or additionally, the ascent maneuver opportunity window icons 216, 218, 220 may be presented to the crew in terms of range from the ITP aircraft 206, wherein a plurality of distances out from the ITP aircraft 206 are presented on the screen shot 202.

The ITP maneuver opportunity window estimator system 100 determines, for this simplified example, that a first ITP ascent maneuver opportunity window becomes available at approximately 8 minutes from the current time. The timing of an ITP ascent maneuver opportunity window is determined in view of the current airspeed of the ITP aircraft 206. The screen shot 202 shows this first ITP ascent maneuver opportunity window by graphically presenting the first ITP ascent maneuver opportunity window icon 216. The example first ITP ascent maneuver opportunity window icon 216 indicates times that the ITP aircraft 206 may begin to ascend while maintaining a minimum safe self-separation distance from the aircraft 208. The top edge 228 of the first ITP ascent maneuver opportunity window icon 216 aligns with the altitude of the aircraft 208 (at "E" feet) to indicate that the first ITP ascent maneuver opportunity window is relative to the aircraft 208. That is, the top edge 228 of the ITP maneuver opportunity window icon 216 is presented at an altitude that corresponds to the other aircraft 208 that will be the closest to the ITP aircraft during the ITP maneuver associated with the ITP maneuver opportunity window icon 216.

Further, the crew appreciates that safe separation distances will be maintained from any other nearby aircraft, such as the example aircraft 210 and 212. (Otherwise, the ITP ascent maneuver opportunity window icon 216 would not be shown on the screen shot 202.)

Further, the first ITP ascent maneuver opportunity window icon 216 defines a time range in which the ITP aircraft 206 must initiate the ITP ascent maneuver. A leading edge 230 of the first ITP ascent maneuver opportunity window icon 216 is associated with a flight time of $t_1$, and indicates to the crew that the ITP ascent maneuver can not begin until the flight time of $t_1$. That is, the time $t_1$ indicates the soonest time that the crew may initiate the ITP maneuver. Optionally, a grade or slope of the leading edge 230 may, in some embodiments, correspond to the current ascent capabilities of the ascending ITP aircraft 206 or to another predefined value.

The trailing edge 232 of the first ITP ascent maneuver opportunity window icon 216 indicates the last flight time of $t_2$ for which the ITP aircraft 206 may initiate the ITP ascent maneuver. That is, the time $t_2$ indicates the latest time that the crew may initiate the ITP maneuver. Accordingly, the crew understands that if they choose to initiate an ITP ascent maneuver, the ITP ascent maneuver must be initiated between the flight time of $t_1$ and the flight time of $t_2$. Optionally, a grade or slope of the trailing edge 232 may, in some embodiments, correspond to the current ascent capabilities of the ascending ITP aircraft 206 or to another predefined value.

In some embodiments, the rate of ascent required to safely implement an ITP ascent is indicated on the screen shot 202 (not shown) or is indicated to the crew in another manner. For example, but not limited to, the required ascent rate information may be indicated in text on the screen shot 202. A range of acceptable ascent rates may be indicated. In some embodiments, the shape of the presented ITP ascent maneuver opportunity window icon 216 may be modified based on ascent rates. If the actual ascent rate of the ITP aircraft 206 during the ITP ascent maneuver is less than, or is more than, the acceptable ascent rate, a warning or other advisory may be issued to the crew.

Summarizing, the ITP maneuver opportunity window estimator system 100 determines a first flight time of $t_1$, wherein the ITP ascent maneuver may first be safely initiated. The ITP maneuver opportunity window estimator system 100 also determines a latest flight time of $t_2$, which indicates the ending time wherein the ITP ascent maneuver may be safely initiated. Based on the most significant nearby aircraft, here aircraft 208, the ITP ascent maneuver opportunity window icon 216 uses the height of the first ITP ascent maneuver opportunity window icon 216 to identify the most significant nearby aircraft 208. The lower edge 234 of the first ITP ascent maneuver opportunity window icon 216 corresponds to the current altitude of the ITP aircraft 206.

In the simplified example of FIG. 2, it is apparent that the ITP aircraft 206 will travel through the storm cell 214 if the crew opts to perform an ITP ascent maneuver in accordance with the ITP ascent maneuver opportunity window icon 216 when an altitude of "F" feet is reached. Accordingly, embodiments of the ITP maneuver opportunity window estimator system 100 may be optionally configured to recommend that the ITP aircraft 206 stop its ascent at "F" feet so as to avoid the storm cell 214. The ITP maneuver opportunity window estimator system 100 would then recommend a second ITP ascent maneuver at a later time after the ITP aircraft 206 has passed the storm cell 214.

Here, the ITP maneuver opportunity window estimator system 100 identifies a second ITP ascent maneuver opportunity window which permits the ITP aircraft 206 to avoid the storm cell 214, and permits the ITP aircraft 206 to ascend to the desired "G" altitude while maintaining a minimum safe self-separation distance from the aircraft 212. Accordingly, this second ITP ascent maneuver opportunity window is graphically depicted by the example ITP ascent maneuver opportunity window icon 218.

The ITP ascent maneuver opportunity window icon 218, similar to the ITP ascent maneuver opportunity window icon 216, indicates to the crew that the second ITP ascent maneuver can not begin until the flight time of $t_1$, and indicates that the last flight time of $t_2$ for which the ITP aircraft 206 may initiate the second ITP ascent maneuver. That is, the crew understands that if they choose to initiate an ITP ascent maneuver, the ITP ascent maneuver must be initiated between the flight time of $t_1$ and the flight time of $t_2$.

Embodiments of the ITP maneuver opportunity window estimator system 100 may be configured to indicate other potential ITP ascent maneuver opportunity windows in the event that the crew of the ITP aircraft 206 choose not to perform the soonest available identified ITP ascent maneuver. In the simplified example of FIG. 2, a second ITP ascent maneuver opportunity window is identified by the presented ITP ascent maneuver opportunity window icon 220. Here, the later ITP ascent maneuver must be initiated between the flight time of $t_1$ and the flight time of $t_2$ as indicated by the ITP ascent maneuver opportunity window icon 220. Here, the crew of the ITP aircraft 206 appreciates that the storm cell 214 will be avoided. Since the top edge of the ITP ascent maneuver opportunity window icon 220 is at the "G" feet altitude, the crew also appreciates that the ITP ascent maneuver will maintain minimum safe self-separation distances from the aircraft 212, and from the other aircraft 208, 210.

Optionally, an elevational flight path line 236 is indicated on the screen shot 202. The elevational flight path line 236 indicates altitude and location if the ITP aircraft 206 substantially follows a flight path corresponding to the recommended ascent maneuver opportunity window icons 216, 218. That is, if the crew of the ITP aircraft 206 execute ITP ascent maneuvers in accordance with the ITP ascent maneuver opportunity window icons 216, 218, the vertical flight path of the ITP aircraft 206 will be approximated by the presented elevational flight path line 236.

The elevational flight path line 236 comprises a first elevational flight path line portion 238 that is horizontal up to a point in time/distance which corresponds to the ITP ascent maneuver opportunity window icon 216. Then, a second elevational flight path line portion 240 illustrates a first path of ascent of the ITP aircraft 206 up to the altitude of "F" feet. The grade or slope of the elevational flight path line portion 240 may, in some embodiments, correspond to the current ascent capabilities of the ascending ITP aircraft 206 or to another predefined value. A third elevational flight path line portion 242 is a horizontal portion which indicates that the ITP aircraft 206 will pass below the storm cell 214. A fourth elevational flight path line portion 244 illustrates a second path of ascent of the ITP aircraft 206 up to the altitude of "G" feet. A fifth elevational flight path line portion 246 is then presented showing the ITP aircraft 206 travelling at the desired altitude of "G" feet.

The presentation of the elevational flight path line 236 may be adjusted based on actual flight of the ITP aircraft 206. For example, if the ITP aircraft 206 initiates the ITP ascent maneuver at the time $t_1$, then the knees of the elevational flight path line 236 at the junction of the portions 238, 240 and the portions 240, 242 may be adjusted to the left. If the rate of ascent is not the same as the initially presented grade or slope of the elevational flight path line portions 240 and/or 244, the grade or slope may optionally be adjusted in accordance with the actual rate of ascent of the ITP aircraft 206 as it executes the ITP ascent maneuvers.

In some embodiments, presentation of the elevational flight path line 236 is optional. That is, the crew may selectively present or selectively omit the elevational flight path line 236 from the screen shot 202. Further, in some embodiments, if the crew wishes to ascend using another ITP ascent maneuver opportunity window, such as the opportunity window represented by the ITP ascent maneuver opportunity window icon 220, a new elevational flight path line corresponding to that particular ITP ascent maneuver may be determined and then be presented on the screen shot 202.

In the event that the crew wishes to ascend in accordance with the ITP ascent maneuver opportunity window icon 220, the crew may adjust the relative position of the screen shot 202 and/or adjust the scale of the screen shot 202. For example, decreasing the scale of the screen shot 202 would permit presentation of a elevational flight path line that shows the elevational flight path of the ITP aircraft 206 from the altitude of "D" up to the altitude of "G" feet. Alternatively, the position of the screen shot may be shifted forward (to the right) so that later times/distances may be shown, and accordingly, would permit presentation of a elevational flight path line that shows the elevational flight path of the ITP aircraft 206 from the altitude of "D" up to the altitude of "G" feet.

FIG. 2 also illustrates a plurality of nearby aircraft 248, 250 at altitudes that are below the current altitude of "D" feet of the ITP aircraft 206. In situations when the crew of the ITP aircraft 206 has specified that an ITP ascent maneuver is to be executed, presentation of the other aircraft 248, 250 is optional for informational purposes only. In some embodiments, the crew may selectively present or selectively omit presentation of the other aircraft 248, 250 from the screen shot 202 via the user interface 118.

FIG. 3 is a simplified example screen shot 302 of a display of a plurality of descent ITP maneuver opportunity windows determined by an embodiment of the ITP maneuver opportunity window estimator system 100. Here, the crew of the ITP aircraft 206 has specified that an ITP descent maneuver is to be executed from the current altitude of "D" feet down to an altitude of "A" feet. For example, the ITP aircraft 206 may be descending on an approach to an airport or may be descending to travel in more favorable prevailing winds.

In this simplified example, presentation of the other aircraft 248, 250 indicates to the crew that an ITP descent maneuver must account for the presence of these other aircraft 248, 250 which are at lower altitudes. A first ITP descent maneuver opportunity window icon 304 indicates to the crew of the ITP aircraft 206 that its ITP descent maneuver may be initiated between the times $T_1$ and $T_2$ indicated by the ITP descent maneuver opportunity window icon 304, which will occur in approximately 15 minutes.

Since the lower edge of the ITP descent maneuver opportunity window icon 304 corresponds to the altitude of "D" feet of the aircraft 206, the crew of the ITP aircraft 206 understands that this first ITP descent maneuver opportunity window had been determined based on the location, bearing, altitude, and airspeed of the aircraft 248. Further, the crew appreciates that other aircraft will not interfere with the ITP descent maneuver that is initiated in accordance with the presented ITP descent maneuver opportunity window icon 304.

In this simplified example, an optional second ITP descent maneuver opportunity window icon 306 is presented to indicate to the crew of the ITP aircraft 206 that the descent may be continued from an altitude of "B" feet to the target altitude of "A" feet such that the minimum safe self-separation distance from the aircraft 250 is maintained once the ITP aircraft 206 descends to the altitude of "A" feet.

Optionally, an elevational flight path line 308 is indicated on the screen shot 302. The elevational flight path line 308 indicates altitude and location if the ITP aircraft 206 substantially follows a flight path corresponding to the recommended descent maneuver opportunity window icons 304, 306. That is, if the crew of the ITP aircraft 206 executes ITP descent maneuvers in accordance with the ITP ascent maneuver opportunity window icons 304, 306, the vertical flight path of the ITP aircraft 206 will be approximated by the presented elevational flight path line 308.

The elevational flight path line 308 comprises a first elevational flight path line portion 310 that is horizontal up to a point in time/distance which corresponds to the ITP descent maneuver opportunity window icon 304. Then, a second elevational flight path line portion 312 illustrates a first path of descent of the ITP aircraft 206 up to the altitude of "B" feet. The grade or slope of the elevational flight path line portion 312 may, in some embodiments, correspond to the current descent capabilities of the descending ITP aircraft 206 or to another predefined value. A third elevational flight path line portion 314 is a sloped portion which indicates that the ITP aircraft 206 descending to the desired altitude of "A" feet.

Presentation of the other aircraft 208, 210, 212 is optional for informational purposes only since these other aircraft 208, 210, 212 are at a higher altitude than the current altitude of "D" feet of the ITP aircraft 206. In some embodiments, the crew may selectively present or omit, via the user interface 118, presentation of the other aircraft 208, 210, 212 from the screen shot 302.

It is appreciated that the simplified example ITP ascent maneuver opportunity windows and the ITP descent maneuver opportunity windows are non-limiting examples of possible ITP maneuvers determined by embodiments of the ITP maneuver opportunity window estimator system 100. That is, each particular ITP ascent maneuver opportunity window and/or ITP descent maneuver opportunity window is based on the particular flight conditions and presence of nearby aircraft which are in the vicinity of the ITP aircraft 206. Accordingly, screen shots 202 associated with an ITP ascent maneuver and screen shots 302 associated with an ITP descent maneuver will be different for each particular flight situation.

In some embodiments, as time progresses during the flight of the ITP aircraft 206, the screen shots 202, 302 may be moved to the left to give the appearance of the movement of the ITP aircraft 206 becoming closer to presented ascent/descent maneuver opportunity window icons. That is, the screen shots 202, 302 may be slid to the left based on the current velocity of the ITP aircraft 206. In some embodiments, an icon corresponding to the ITP aircraft 206 may be moved to the right to give the appearance of the movement of the ITP aircraft 206 becoming closer to presented ascent/descent maneuver opportunity window icons. In such embodiments, the positioning of the ascent/descent maneuver opportunity window icons on the screen shots 202, 302 may remain constant. In some embodiments, icons corresponding to other nearby aircraft may be adjusted on the screen shots 202, 302 so that the crew appreciates the relative location of those aircraft as time progresses during the flight of the ITP aircraft 206.

In the various embodiments, the screen shots 202 associated with an ITP ascent maneuver and the screen shots 302 associated with an ITP descent maneuver are periodically refreshed as newer information becomes available. Alternatively, or additionally, the screen shots 202, 302 may be refreshed based on some predefined duration, such as a minute or the like. The duration of time-based refresh rates may be automatically adjusted by the ITP maneuver opportunity window estimator system 100 based on flight conditions. For example, if one or only a few other aircraft are nearby, the refresh duration may be relatively long, On the other hand, the ITP maneuver opportunity window estimator system 100 may automatically increase the refresh rate (decrease the refresh duration) if there is a relatively large number of nearby aircraft. Alternatively, or additionally, the refresh rate may be adjusted when the ITP aircraft 206 changes its velocity. Alternatively, or additionally, the refresh rate may be manually adjustable or selectable by the crew of the ITP aircraft 206 via the user interface 118.

Any suitable shape, fill pattern, color, intensity or the like may be used for presentation of ITP ascent/descent maneuver opportunity window icons. Alternatively, or additionally, different ITP ascent/descent maneuver opportunity window icons may be presented using different shapes, fill patterns, colors, intensities or the like. For example, the first ITP ascent or descent maneuver opportunity window icon may be presented using a higher intensity than later ITP ascent/descent maneuver opportunity window icons.

In the various embodiments, the times $T_1$ and $T_2$ indicated by the ITP ascent/descent maneuver opportunity window icons may be shown at any suitable location in proximity to the presented ITP ascent/descent maneuver opportunity window icons. Alternatively, or additionally, the times $T_1$ and $T_2$ may be omitted. Alternatively, or additionally, the presentation of the times $T_1$ and $T_2$ may be selectively omitted by the crew via the user interface 118.

Figure 4:
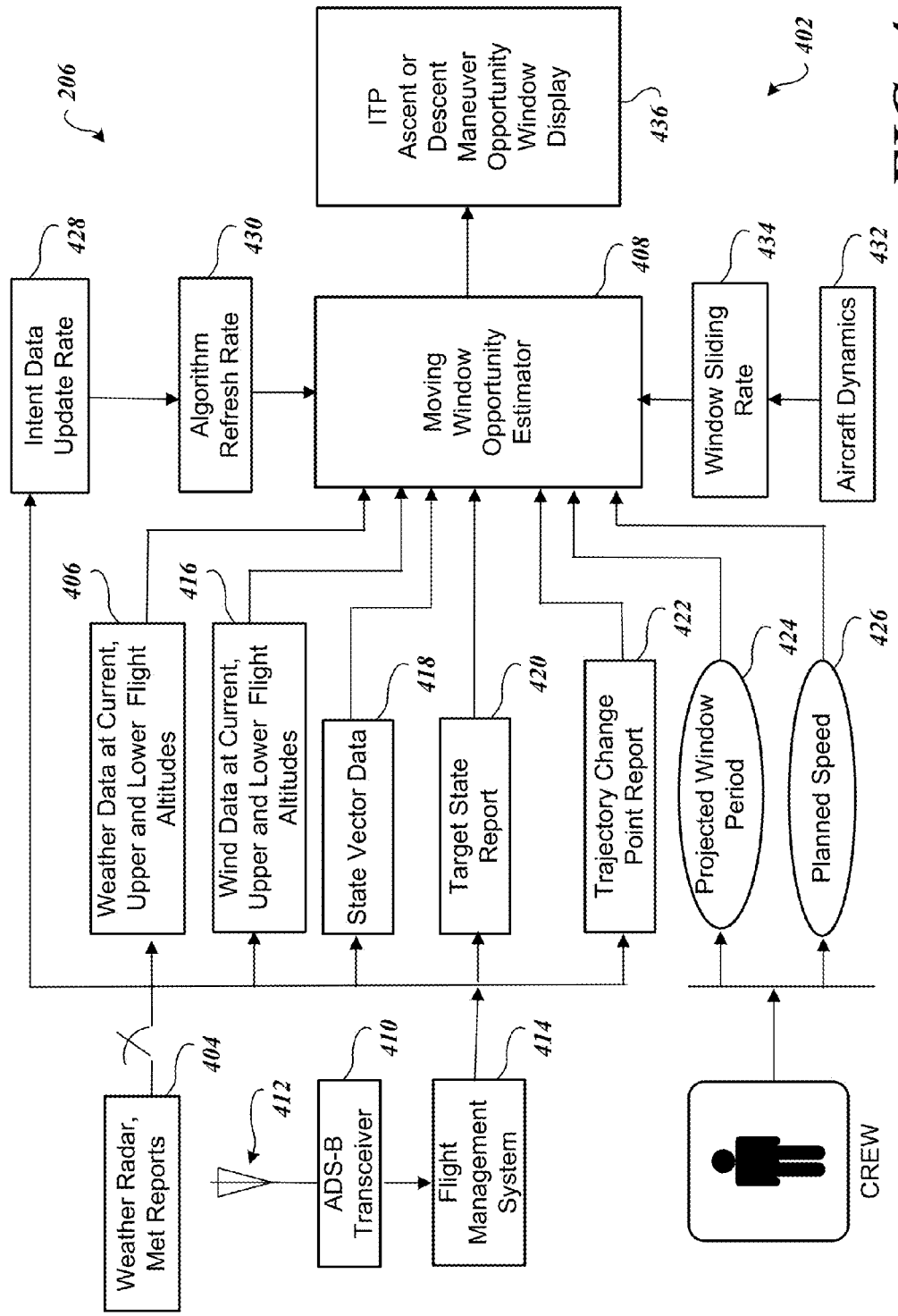
FIG. 4 is a schematic block diagram of an embodiment of the ITP maneuver opportunity window estimator system.

FIG. 4 is a schematic block diagram 402 of an embodiment of the ITP maneuver opportunity window estimator system 100. Alternative embodiments may include other schematic elements, and/or the schematic elements may be interconnected with each other in alternative configurations. The functionality of the various schematic elements of FIG. 4 are implemented by the modules 126, 128, 130, 132, 134 residing in the memory 116 (FIG. 1) and/or by other logic.

A first example input schematic element 404 corresponds to weather radar information and/or other meteorological (Met) reports that may be received from the onboard weather radar system and/or that may be received from external sources, such as other aircraft and/or ground stations. Received weather information is stored, as indicated by the schematic element 406. The stored weather information is retrieved by the moving window opportunity window estimator 408 when ITP ascent maneuver opportunity windows and/or ITP descent maneuver opportunity windows are determined.

A second example input schematic element corresponds to the ADS-B transceiver 410 that receives communications, at the antenna 412, from multiple nearby aircraft. The received communications include information pertaining to the broadcasting nearby aircraft, such as current bearing, altitude, airspeed, and/or location. In some embodiments, the received ADS-B information may be input into a flight management system 414 onboard the ITP aircraft 206. Alternatively, the received ADS-B information may be input directly into another schematic element of the ITP maneuver opportunity window estimator system 100. The received ADS-B information may include weather related information provided by the broadcasting aircraft, as indicated by the schematic element 416.

The flight management system 414 may also provide state vector data, as indicated by the schematic element 418. The state vector data may include location, bearing, altitude, and airspeed information for the ITP aircraft 206 and optionally surrounding aircraft.

Target state reports for each broadcasting aircraft and for the ITP aircraft 206 is stored, as indicated by the schematic element 420. State information may include location, bearing, altitude, and airspeed information for nearby aircraft which are relevant to ITP ascent or descent maneuvers.

The flight management system 414 may also provide trajectory change point reports, as indicated by the schematic element 422. For example, way point information or the like which defines a planned flight path of the ITP aircraft 206 may be used to define ITP ascent or descent maneuver opportunity windows. Some embodiments may also use trajectory change point reports in the ADS-B information received from other aircraft.

A third example input corresponds to information specified by the crew of the ITP aircraft 206. The crew may specify a projected window period, as indicated by the schematic element 424. The projected window period may define a period of interest where the crew is interested in completing one or more ITP maneuvers to a desired ITP altitude. The projected window period may be specified by the crew of the ITP aircraft 206. Alternatively, the projected window period may be predefined. The predefined projected window period may later be adjusted by the crew.

In some embodiments, the crew may input a planned speed of the ITP aircraft 206, and optionally, the time that the planned speed change is to occur as indicated by the schematic element 426. For example, the crew may plan to decrease airspeed of the ITP aircraft 206 in the event that they wish to descend when on an approach to an airport.

Another input is the intent data update rate, as indicated by the schematic element 428. For example, updated ADS-B information may be received from one or more nearby aircraft. This update rate ensures that ITP ascent or descent maneuver opportunity windows are reevaluated based on changes in the ADS-B intent data received from other aircraft. For example, after viewing presented ITP ascent/descent maneuver opportunity window icons, the one of the nearby aircraft may change its current bearing and/or adjust its flight plan.

Another input is the algorithm refresh rate, as indicated by the schematic element 430. This update rate ensures that ITP ascent or descent maneuver opportunity windows are identified based on the most current information available.

Another input is the aircraft dynamics, as indicated by the schematic element 432. The aircraft dynamic information ensures that ITP ascent or descent maneuver opportunity windows are identified based on the desired ascent or descent limits, or is based on ascent capabilities, of the ITP aircraft 206. For example, a predefined descent rate may be used to define an ITP descent maneuver opportunity window. Alternatively, an ITP ascent maneuver opportunity window may be determined based on the maximum rate of ascent which may be achieved by the ITP aircraft 206 based on its dynamics.

The schematic element 434 may predict, and then adjust, the screen shots which present the determined ITP ascent/descent maneuver opportunity windows. For example, but not limited to, the screen shots may be slid (moved) in relation to current speed of the ITP aircraft 206 so that the crew is viewing relevant ITP ascent/descent maneuver opportunities.

The various inputs are provided to the moving window opportunity window estimator 408. The resulting identified ITP ascent/descent maneuver opportunity windows are then determined. The screen shots with one or more ITP ascent/descent maneuver opportunity window icons may be generated and then communicated to a display, as indicated by the schematic element 436.

Figure 5:
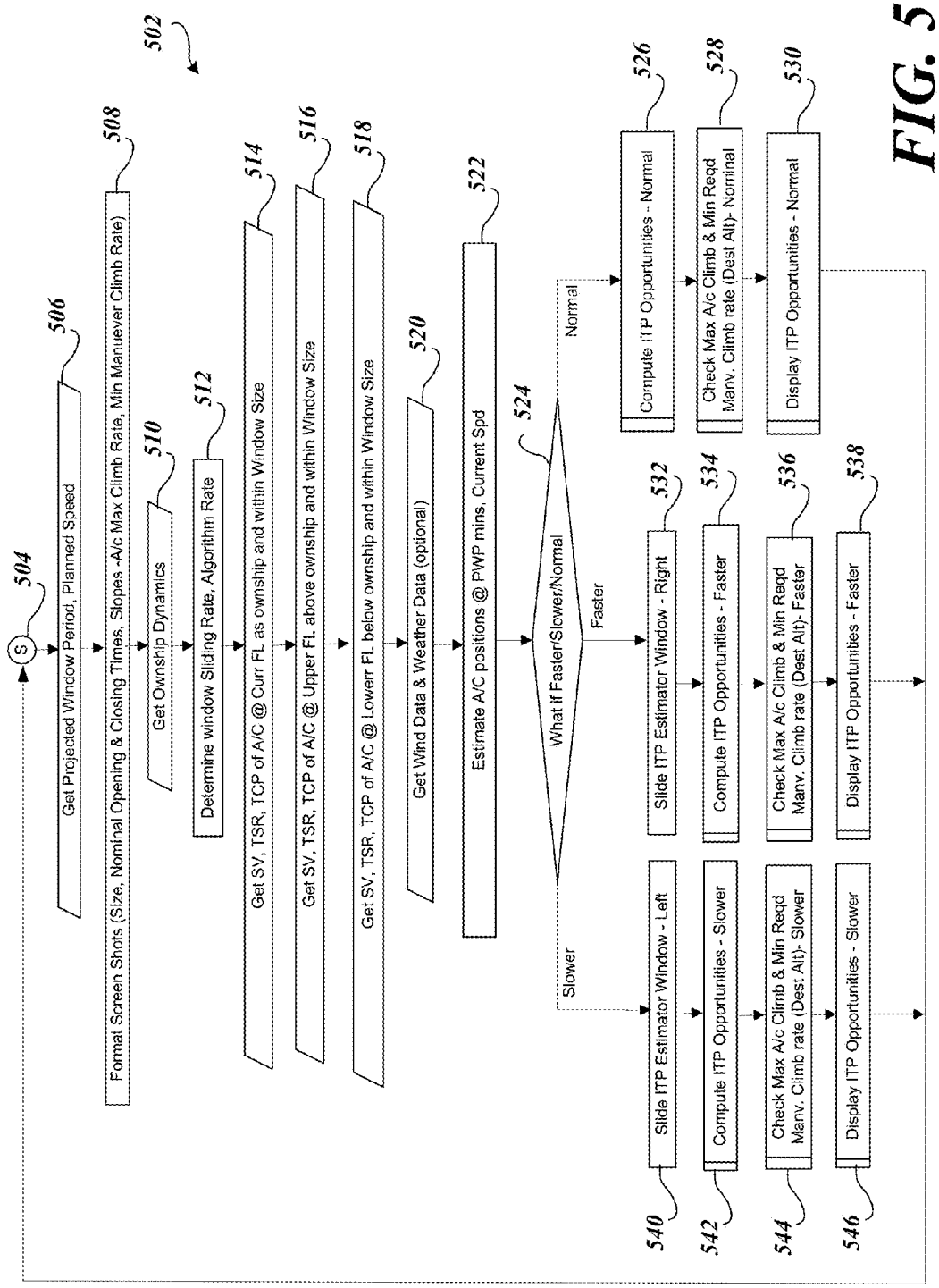
FIG. 5 is a flowchart illustrating the operation of the ITP maneuver opportunity window estimator system.

FIG. 5 is a flowchart 502 illustrating the operation of the ITP maneuver opportunity window estimator system 100. The flowchart 502 shows the architecture, functionality, and operation of a possible implementation of software for implementing the ITP maneuver opportunity window estimator system 100. In this regard, each block may represent a module, segment, or portion of code, which comprises one or more executable instructions for implementing the specified logical function(s). It should also be noted that in some alternative implementations, the functions noted in the blocks may occur out of the order noted in FIG. 5, may include additional functions, and/or may omit some functions. For example, two blocks shown in succession in FIG. 5 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

With respect to FIG. 5, the process of the flow chart 502 starts at block 504, for example, in response to the starting or powering up of the ITP maneuver opportunity window estimator system 100, or in response to a signal from the user interface 118 (FIG. 1) indicating that the crew of the ITP aircraft 206 is intending to implement, or is inquiring about, ITP ascent/descent maneuver opportunities. At block 506, a projected window period of a screen shot or a period of interest is obtained. Further, the period may be adjusted based on a planned speed of the ITP aircraft 206. For example, the period may be increased with increasing speed of the ITP aircraft 206. Such information may be predefined and stored in the memory 116 or another suitable memory medium, may be based on prior screen shot information, and/or may be input as parameters specified by the crew. Depending upon the embodiment, the window period may be expressed as a duration (time) and/or based on distance (range) from the ITP aircraft 206.

At block 508, a format for the screen shot is defined. Screen shot format parameters may include, but are not limited to, a size or extent of the screen shot, nominal opening and closing times associated with ITP ascent/descent maneuver opportunity window icons, slopes of the portions of the elevational flight path lines that indicate altitude changes during TIP ascent or descent maneuvers, and/or current ascent capabilities of the ascending ITP aircraft. In some embodiments, a minimum climb rate and/or a maximum descent rate may be specified.

At block 510, dynamics of the ITP aircraft 206 (ownship dynamics) are obtained. That is, the dynamic characteristics of the ITP aircraft 206, such as lift characteristics, weight (aircraft, passenger, cargo weights), fuel consumption rates, or the like is obtained. Some of the information may be obtained in real time from sensors, such as a fuel gauge or the like, onboard the ITP aircraft 206.

At block 512, the window sliding rate and/or algorithm rate are obtained. This information may be used to define various refresh rates so that the crew is presented with current valid screen shots that identify ITP ascent or descent maneuver opportunity windows.

At block 514, ownship state vectors (SV), target state reports (TSR), and or trajectory change points (TCP) information is obtained. Some of the information may be obtained in real time from sensors, such as a fuel gauge or the like, onboard the ITP aircraft 206. Information pertaining to location, bearing, altitude, and airspeed of the ITP aircraft 206 may be obtained at block 514. The planned flight path may be used to define TCP information or the like.

At block 516, state vectors (SV), target state reports (TSR), and or trajectory change points (TCP) information for nearby aircraft that are in proximity to the ITP aircraft 206, and that are above the current flight level (FL) of the ITP aircraft 206, is obtained. At block 518, state vectors (SV), target state reports (TSR), and or trajectory change points (TCP) information for nearby aircraft that are in proximity to the ITP aircraft 206, and that are below the current flight level (FL) of the ITP aircraft 206, is obtained. This information may be obtained from received ADS-B information or from the radar system 110 onboard the ITP aircraft 206. Alternatively, or additionally, the information may be obtained from the onboard radar system. In some embodiments, a predefined range from the ITP aircraft 206 may be used to identify nearby aircraft of interest that are to be considered during determination of ITP ascent/descent maneuver opportunity windows. In some embodiments, the range of such nearby aircraft may be adjustable by the crew of the ITP aircraft 206, or may be automatically adjusted based on speed of the ITP aircraft 206 (where the range increases as speed increases).

At block 520, wind speed data and/or weather data is optionally obtained for the current flight level and at other altitudes that are relevant for the region of airspace defined by the screen shots.

At block 522, aircraft (A/C) positions at various times associated with the screen shots are estimated. That is, the location, bearing, altitude, and airspeed of the ITP aircraft 206 (ownship) and the neighboring aircraft are estimated as a function of time.

At block 524, a determination is made whether the speed of the ITP aircraft 206 will be its normal speed (current speed), will be a faster speed, or will be a slower speed. If the ITP aircraft 206 is at its normal speed, then at block 526, ITP ascent or descent maneuver opportunity windows are identified. At block 528, checks are made regarding the current ascent or descent capabilities of the ITP aircraft 206. If the checks indicate that the capabilities have changed, new ITP ascent/descent maneuver opportunity windows are determined. At block 530, the ITP ascent or descent maneuver opportunity windows are presented to the crew of the ITP aircraft 206. That is, the screen shots showing the ITP ascent/descent maneuver opportunity window icons are communicated to and presented on a suitable display, such as the example display 122.

If at block 524 a determination is made that the speed of the ITP aircraft 206 will be a faster speed, then at block 532 the previously determined screen shots (ITP estimator windows) may be slid (moved) to the right by an amount corresponding to the increase in aircraft speed. At block 534, revised ITP ascent/descent maneuver opportunity windows based on the faster aircraft speed are determined. At block 536, checks are made regarding the current ascent or descent capabilities of the ITP aircraft 206. If the checks indicate that the capabilities have changed, new ITP ascent/descent maneuver opportunity windows are determined. At block 538, the new ITP ascent or descent maneuver opportunity windows are presented to the crew of the ITP aircraft 206. That is, the screen shots showing the new ITP ascent/descent maneuver opportunity window icons are communicated to and presented on a suitable display, such as the example display 122.

On the other hand, if at block 524 a determination is made that the speed of the ITP aircraft 206 will be a slower speed, then at block 540 the previously determined screen shots (ITP estimator windows) may be slid (moved) to the left by an amount corresponding to the increase in aircraft speed. At block 542, revised ITP ascent/descent maneuver opportunity windows based on the slower aircraft speed are determined. At block 544, checks are made regarding the current ascent or descent capabilities of the ITP aircraft 206. If the checks indicate that the capabilities have changed, new ITP ascent/descent maneuver opportunity windows are determined. At block 546, the new ITP ascent or descent maneuver opportunity windows are presented to the crew of the ITP aircraft 206. That is, the screen shots showing the new ITP ascent/descent maneuver opportunity window icons are communicated to and presented on a suitable display, such as the example display 122.

After the screen shots are generated and presented on a display to the crew, in an example embodiment, the process loops back up to block 504 and restarts and/or refreshes.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for estimating an In-Trail procedure (ITP) altitude change by an ITP aircraft in an airspace occupied by a plurality of other aircraft that broadcast automatic dependent surveillance broadcast (ADS-B) information, wherein the ADS-B information comprises at least current location, bearing, altitude, and airspeed of the broadcasting plurality of other aircraft, the method comprising:

receiving information corresponding to a desired ITP altitude for the ITP aircraft;

receiving at the ITP aircraft the broadcast ADS-B information for each one of the plurality of other aircraft;

estimating over a projected window period at least locations of the plurality of other aircraft based on the received ADS-B information, wherein the projected window period corresponds to a period of time during which a crew of the ITP aircraft desires to transition to the desired ITP altitude;

estimating multiple ITP maneuver opportunity windows based on the estimated location of each aircraft of the plurality of other aircraft and based on a current airspeed and a current altitude of the ITP aircraft, wherein the ITP aircraft reaches the desired ITP altitude at the completion of two or more ITP maneuvers, and wherein each of the multiple ITP maneuver opportunity windows defines at least a soonest time for the ITP aircraft to initiate an ITP maneuver of the two or more ITP maneuvers and a latest time for the ITP aircraft to initiate the same ITP maneuver; and generating a graphical display that presents an ITP maneuver opportunity window icon for each of the multiple ITP maneuver opportunity windows, wherein the ITP maneuver opportunity window icon graphically indicates at least the soonest time and the latest time for the ITP aircraft to initiate the ITP maneuver associated with the ITP maneuver opportunity window icon.

2. The method of claim 1, wherein a top edge of at least one of the ITP maneuver opportunity window icons is presented at an altitude that corresponds to one of the plurality of other aircraft that is the closest to the ITP aircraft during the ITP maneuver associated with the at least one of the ITP maneuver opportunity window icons.

3. The method of claim 1, wherein the ITP maneuver opportunity window icons comprise a first ITP maneuver opportunity window icon and a second ITP maneuver opportunity window icon, wherein a bottom edge of the second ITP maneuver opportunity window icon is presented at an altitude that corresponds to top edge of the first ITP maneuver opportunity window icon, and wherein a top edge of the second ITP maneuver opportunity window icon is presented at an altitude that corresponds to at least the desired ITP altitude and to a second one of the plurality of other aircraft that is the closest to the ITP aircraft during the second ITP maneuver associated with the second ITP maneuver opportunity window icon.

4. The method of claim 1, further comprising:
receiving crew information specifying the projected window period.

5. The method of claim 1, further comprising:
receiving information corresponding to a desired speed of the ITP aircraft, wherein the desired speed is specified by the crew of the ITP aircraft, and wherein the multiple ITP maneuver opportunity windows are estimated based on the specified desired speed.

6. The method of claim 1, wherein, when the ITP maneuver is an ascent, a slope of a leading edge of at least one of the ITP maneuver opportunity window icons corresponds to a maximum ascent capability of the ITP aircraft.

7. The method of claim 1, wherein a slope of a leading edge of at least one of the ITP maneuver opportunity window icons corresponds to a predefined ascent rate of the ITP aircraft associated with the at least one of the ITP maneuver opportunity window icons is an ascent or a predefined descent rate of the ITP aircraft when the ITP maneuver associated with the at least one of the ITP maneuver opportunity icons is a descent.

8. The method of claim 1, wherein the ADS-B information further comprises intent information, and wherein estimating over a projected window period at least locations of the plurality of other aircraft comprises estimating the at least locations based on the received intent information.

9. A method for identifying opportunities for an In-Trail procedure (ITP) aircraft to make an ITP altitude change in an airspace occupied by a plurality of other aircraft that broadcast automatic dependent surveillance broadcast (ADS-B) information, wherein the ADS-B information comprises at least current location, bearing, altitude, and airspeed of the broadcasting plurality of other aircraft, the method comprising:
receiving information corresponding to a desired ITP altitude for the ITP aircraft and a projected window period, wherein the projected window period corresponds to a period of time during which a crew of the ITP aircraft desires to transition to the desired ITP altitude;

estimating at least locations of the plurality of other aircraft as a function of time based on the received ADS-B information over the projected window period;

estimating multiple ITP maneuver opportunity windows based on the estimated location of each aircraft of the plurality of other aircraft, and based on a current airspeed and a current altitude of the ITP aircraft; and generating a graphical display that presents an ITP maneuver opportunity window icon for each of the multiple ITP maneuver opportunity windows, wherein the ITP maneuver opportunity window icon graphically indicates at least a soonest time for the ITP aircraft to initiate the ITP maneuver and a latest time for the ITP aircraft to initiate the ITP maneuver associated with the ITP maneuver opportunity window icon, and wherein the ITP maneuver opportunity window icon graphically indicates an altitude change associated with the ITP aircraft for maintaining minimum safe self-separation distances from the plurality of other aircraft during the ITP maneuver.

10. The method of claim 9, further comprising:
communicating the graphical display to a display, wherein the graphical display is presented on the display.

11. The method of claim 9, wherein the ITP maneuver opportunity window icon for at least one of the multiple ITP maneuver opportunity windows is slid to the right in response to receiving information corresponding to a desired increase in airspeed of the ITP aircraft or is periodically slid to the right as a function of time.

12. The method of claim 9, wherein the ITP aircraft is performing an ITP ascent maneuver, the method further comprising:
determining a current weight of the ITP aircraft;
determining current ascent capabilities of the ITP aircraft based on the determined weight of the ITP aircraft; and
comparing at least one ITP maneuver opportunity window from the multiple ITP maneuver opportunity windows with the current ascent capabilities of the ITP aircraft, wherein the ITP maneuver opportunity window icon associated with the at least one ITP maneuver opportunity window is presented only if the current ascent capabilities of the ITP aircraft are sufficient for the ITP aircraft to ascend in accordance with the at least one ITP maneuver opportunity window.

13. The method of claim 1, further comprising:
displaying the graphical display on a display; and
sliding, based on the current airspeed of the ITP aircraft, the generated screen shot to the left of the display.

14. A system for estimating an In-Trail procedure (ITP) altitude change, the system comprising:
a user interface configured to receive information corresponding to a desired ITP altitude for an ITP aircraft;
an ADS-B transceiver configured to receive automatic dependent surveillance broadcast (ADS-B) information from a plurality of other aircraft, wherein the plurality of other aircraft occupy an airspace with the ITP aircraft, wherein the plurality of other aircraft broadcast the ADS-B information, and wherein the ADS-B information comprises at least current location, bearing, altitude, and airspeed of the broadcasting plurality of other aircraft;
an ITP opportunity window estimator module configured to estimate multiple ITP maneuver opportunity windows over a projected window period based on an estimated location of each aircraft of the plurality of other aircraft over the projected window period, determined based on the ADS-B information, and based on a current airspeed and a current altitude of the ITP aircraft, wherein the projected window period corresponds to a period of time during which a crew of the ITP aircraft desires to transition to the desired ITP altitude, wherein the ITP aircraft reaches the desired ITP altitude at the completion of two or more ITP maneuvers, and wherein each of the multiple ITP maneuver opportunity windows defines at least a soonest time for the ITP aircraft to initiate an ITP maneuver of the two or more ITP maneuvers and a latest time for the ITP aircraft to initiate the same ITP maneuver; and a graphics processing module configured to generate a graphical display that presents an ITP maneuver opportunity window icon for each of the multiple ITP maneuver opportunity windows, wherein the ITP maneuver opportunity window icon graphically indicates at least the soonest time and the latest time for the ITP aircraft to initiate the ITP maneuver associated with the ITP maneuver opportunity window icon.

15. The system of claim 14, wherein the ITP maneuver opportunity window icons comprise a first ITP maneuver opportunity window icon and a second ITP maneuver opportunity window icon, wherein a bottom edge of the second ITP maneuver opportunity window icon is presented in the graphical display at an altitude that corresponds to a top edge of the first ITP maneuver opportunity window icon, and wherein a top edge of the second ITP maneuver opportunity window icon is presented in the graphical display at an altitude that corresponds to at least the desired ITP altitude and to a second one of the plurality of other aircraft that is the closest to the ITP aircraft during the second ITP maneuver associated with the second ITP maneuver opportunity window icon.

16. The system of claim 14:
wherein the user interface is further configured to receive information corresponding to a desired speed of the ITP aircraft, wherein the desired speed is specified by the crew of the ITP aircraft, and
wherein the ITP opportunity window estimator module is further configured to estimate the multiple ITP maneuver opportunity windows based on the specified desired speed.

17. The system of claim 14, wherein, when the ITP maneuver is an ascent, a slope of a leading edge of at least one of the ITP maneuver opportunity window icons corresponds to a maximum ascent capability of the ITP aircraft.

18. The system of claim 14, wherein a slope of a leading edge of at least one of the ITP maneuver opportunity window icons corresponds to one of a predefined ascent rate of the ITP aircraft when the ITP maneuver associated with the at least one of the ITP maneuver opportunity window icons is an ascent or a predefined descent rate of the ITP aircraft when the ITP maneuver associated with the at least one of the ITP maneuver opportunity icons is a descent.

19. The system of claim 14, wherein the ADS-B information further comprises intent information from the plurality of other aircraft, and wherein the ITP opportunity window estimator module is further configured to estimate the location of each aircraft of the plurality of other aircraft based on the intent information.

20. The system of claim 14, further comprising:
a display configured to display the generated screen shot, wherein the graphics processing module is further configured to adjust the generated graphical display in relation to the current airspeed of the ITP aircraft; and
wherein the adjustment to the generated screen shot causes the generated screen shot to slide to the left of the display in relation to the current airspeed of the ITP aircraft.

* * * * *

UNITED STATES PATENT AND TRADEMARK OFFICE
CERTIFICATE OF CORRECTION

PATENT NO. : 9,297,895 B2
APPLICATION NO. : 13/600131
DATED : March 29, 2016
INVENTOR(S) : Rajanikanth Nagaraj Kashi et al.

It is certified that error appears in the above-identified patent and that said Letters Patent is hereby corrected as shown below:

In the claims,

Column 19, Claim 7, Line 47: "corresponds to a predefined ascent rate" should read -- corresponds to one of a predefined ascent rate --

Column 19, Claim 7, Lines 47 and 48: "ITP aircraft associated" should read -- ITP aircraft when the ITP maneuver associated --

Signed and Sealed this
Twenty-third Day of August, 2016

Michelle K. Lee
*Director of the United States Patent and Trademark Office*